DATA PROCESSING

Filed Nov. 14, 1962 4 Sheets-Sheet 1

| S | 1 | 0 |
|---|---|---|
| R | 0 | 1 |
| X | 1 | 0 |
| X̄ | 0 | 1 |

INVENTORS
LASZLO L. RAKOCZI &
BY JOHN W. FIGUEROA
Samuel Cohen
ATTORNEY

INVENTORS
LASZLO L. RAKOCZI &
BY JOHN W. FIGUEROA
ATTORNEY

INVENTORS
LASZLO L. RAKOCZI &
JOHN W. FIGUEROA
BY Samuel Cohen
ATTORNEY

INVENTORS
LASZLO L. RAKOCZI &
JOHN W. FIGUEROA
BY Samuel Cohen
ATTORNEY 3,242,349
DATA PROCESSING Laszlo Leslie Rakoczi, Phoenix, Ariz., and John W. Figueroa, Arcadia, Calif., assignors to Radio Corporation of America, a corporation of Delaware Filed Nov. 14, 1962, Ser. No. 237,538
6 Claims. (Cl. 307—88.5)

The present invention relates to the control of a data processing system such as a digital computer.

In an asynchronous digital data processing system, to achieve maximum operating speeds, each logic or other asynchronous stage should initiate its operation immediately upon the completion of the operation of the preceding stage. For example, in the case of an addition operation, the adder should start its operation as soon as it receives the addend and augend words from the registers storing these words. Similarly, the sum word should be transferred from the adder as soon as the addition is completed. The time required to perform these operations varies from one operation to another and does so in a manner which is generally not predictable. Further, in a particular data processing system under consideration, the respective machine instruction signals (sometimes known as "operations" signals) directing the operation of each stage to start, have durations sufficient to permit very fast operation only of each stage. For example, in the case of addition, the duration of the machine instruction signal may be sufficient to permit the addition of addend and augend words made up largely of "zeros," but insufficient to permit the "worst case" time, that is the time required to add two words made up of all "ones." In the latter case, the machine instruction signal directing the transfer of the sum word out of the adder arrives well before the addition is completed, and the machine instruction signal directing the addition of the two words terminates well prior to the time that the addition has been completed.

A specific object of the present invention is to provide a circuit in an asynchronous data processing system which, in response to machine instruction signals directing certain operations to be performed in sequence, causes these operations to be performed in sequence and at appropriate times.

A more general object of the present invention is to provide a novel circuit for producing an output in response to two signals which occur in a given sequence, but only upon receipt of a third signal which may occur before or after the second occuring of the two signals.

Another object of the invention is to provide, in an asynchronous data processing system, a circuit which, in response to the receipt of a machine instruction signal directing a certain operation to be performed, causes the operation to be performed immediately if the previous operation has been completed but which temporarily stores the machine instruction signal if the previous operation has not yet been completed, until the previous operation is completed.

One embodiment of the system of the invention includes at least first and second logic gates such as "nor" gates. The logical sum of the outputs of these gates is applied back through an inverter as a "hold" signal to the first of these gates. So interconnected, a given change in the condition of an input signal to the second gate, prior to the time that the input signal to the first gate has changed, produces no change in the circuit output. However, the given change in the input signal to the second gate after the input signal to the first gate has changed causes the circuit to produce an output.

The invention is described in greater detail below and is illustrated in the following drawing of which:

FIGURES 1*a*–1*d* are diagrams to explain the symbols employed in some of the remaining figures;

Figure 5:
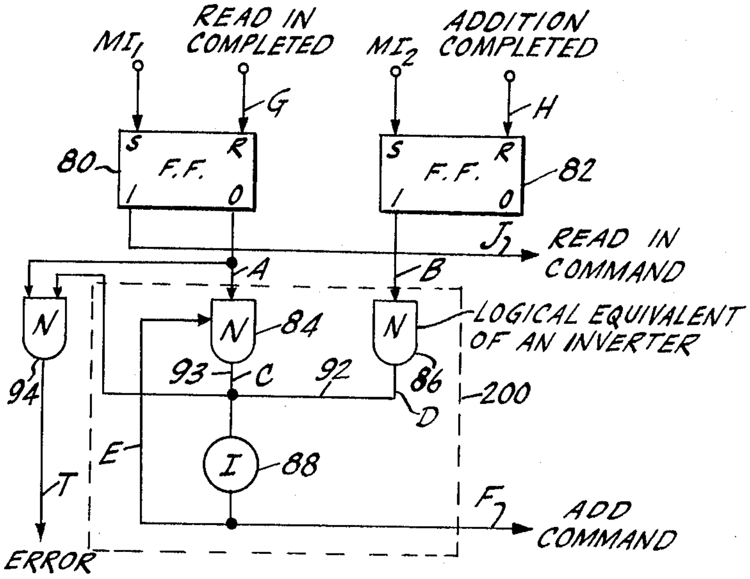
FIGURE 5 is a block circuit diagram of one form of the present invention.
Figure 7:
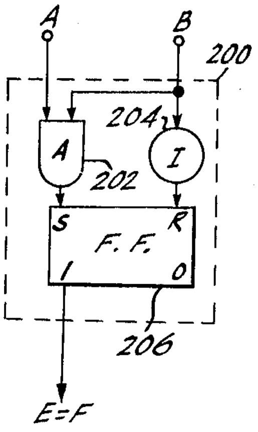

FIGUURE 6 is a block circuit diagram of another form of the present invention; and FIGURE 7 is a block circuit diagram of a circuit which operates similarly to the circuit of FIG. 5.

Similar reference letters and numerals are used to represent similar elements in the various figures.

A number of blocks shown in the various figures represent known circuits. The circuits of the blocks are actuated by electrical signals appled to the blocks. When a signal is at one level, it represents the binary digit "1" and when it is at another level it represents the binary digit "0." For the sake of the discussion which follows, it may be assumed that a positive-going signal represents the binary digit "1" and a negative-going signal represents the binary digit "0." Also, to simplify the discussion, rather than speaking of an electrical signal being applied to a block or logic stage, it is sometimes stated that a "1" or a "0" is applied to a block or level stage.

The symbols employed in the various figures are shown in FIGURE 1. FIGURE 1*a* represents a binary storage circuit called a flip-flop. As indicated by the truth table, when the flip-flop is set its 1 or X output is "1," and its "0" or $\overline{X}$ output is "0." When the flip-flop is reset, its X output is "0" and its $\overline{X}$ output is "1." FIGURE 1*b* shows a "nor" gate and its Boolean equation as shown to the right of the gate. FIGURES 1*c* and 1*d* show an "and" gate and an inverter, respectively.

Figure 2:
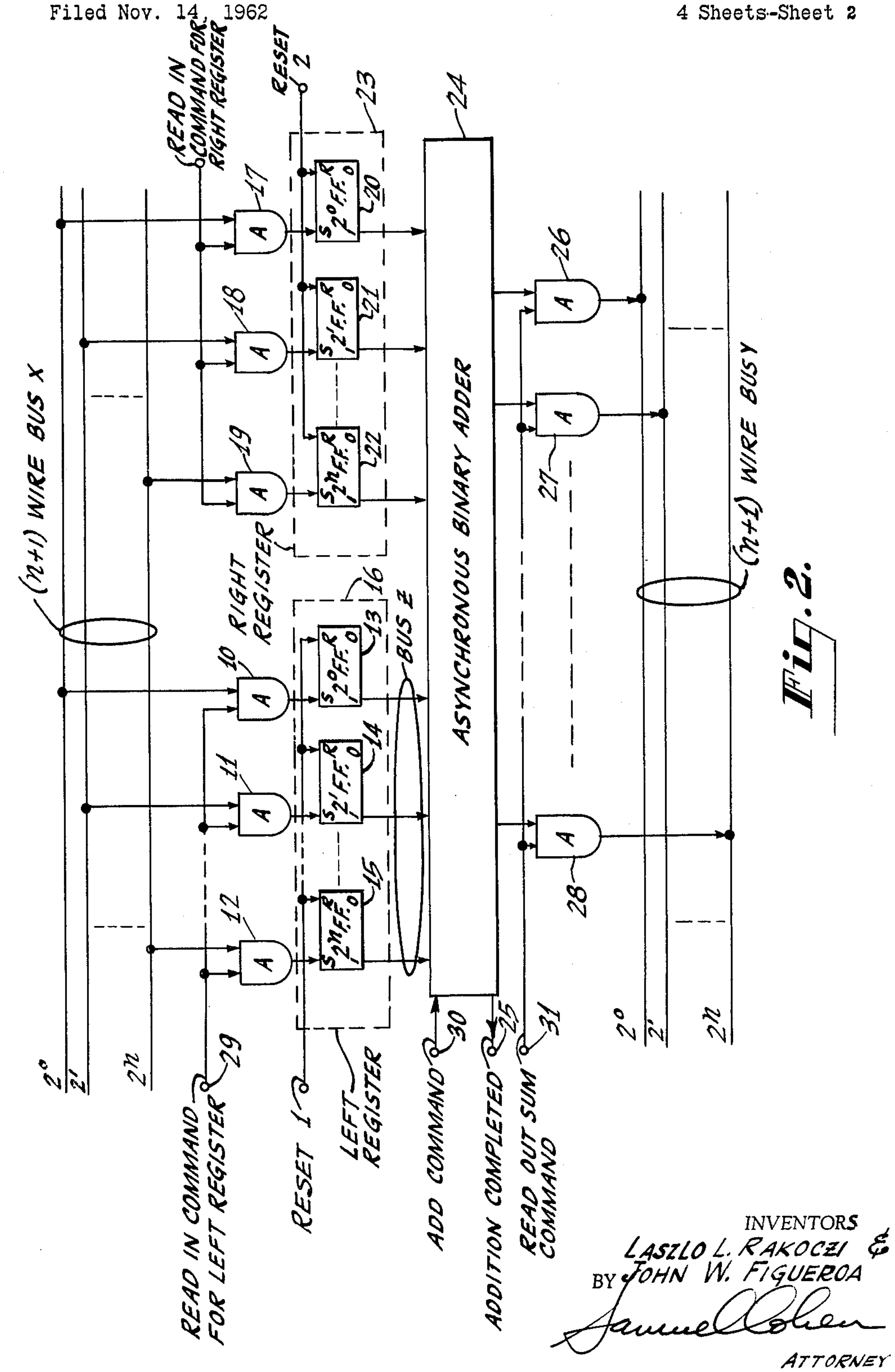
FIGURE 2 is a block circuit diagram of a portion of an asynchronous digital data processing machine. This diagram is useful in explaining, by way of example, where in the machine the circuits of the present invention may be employed.

The circuit shown in FIGURE 2 illustrates, by way of example, where in an asynchronous digital data processing machine the circuits of the present invention may be employed. It includes an $n+1$ wire bus which carries the bits of a binary word. The bus may come from the memory system (not shown) of the data processing machine. In a typical machine $n+1$ may equal 28 or 56 or some other large number of wires; however, only three of these wires are shown. The wires of the bus are connected through "and" gates 10, 11 . . . 12 to the set terminals of flip-flops 13, 14 . . . 15. (Again, only three of the $n+1$ gates and three of the $n+1$ flip-flops are shown.) These $n+1$ flip-flops make up the left register 16. As the flip-flop 13 stores the bit of least significance, it is legended $2^0$ flip-flop. In like manner since the last flip-flop 15 stores the bit of most significance, it is legended $2^n$ flip-flop. The wires of the bus are also legended $2^0$, $2^1$ . . . $2^n$, corresponding to the significance of the bits the respective wires carry.

The respective wires of bus X are also connected through "and" gates 17, 18 . . . 19 to the set terminals of flip-flops 20, 21 . . . 22. The latter flip-flops make up the right register 23.

The 1 outputs of the left and right registers are connected to an asynchronous binary adder 24. Its function is to add the words stored in the left and right registers and also, when the addition is completed, to produce an output signal at lead 25. Details of the adder may be found in co-pending application Serial No. 112,677, filed April 25, 1961, by L. L. Rakoczi and F. L. Wang and assigned to the same assignee as the present invention.

The sum output of the asynchronous binary adder is applied through "and" gates 26, 27 . . . 28 to the respective wires of the bus Y. This bus may lead back to a register (not shown) for temporarily storing the sum word.

The operation of the system shown in FIGURE 2 is controlled by machine instruction signals generated in the control unit (not shown) of the data processing system. These machine instruction signals are shown at $MI_1$, $MI_2$ and $MI_3$ in FIGURE 3. As may be observed in FIGURE 3, the machine instruction signals are relatively short and occur in time sequence. For example, the leading edge of machine instruction signal $MI_2$ may occur at about the same time as the lagging edge of the machine instruction signal $MI_1$.

In the example chosen for illustration, it is assumed that the right register 23 of FIGURE 2 is storing a word. The machine instruction signal $MI_1$ directs the transfer of a word from the bus X to the left register 16. Machine instruction signal $MI_2$ directs the asynchronous binary adder to start adding the words in the two registors 16, 23. The machine instruction signal $MI_3$ directs the binary adder to transfer the sum word to the output bus Y and thence to a register (not shown).

The various times required to perform the operations above vary from operation to operation. As may be seen in FIGURE 3, for example, the time $\Delta t_1$ required to transfer a word from a bus into the register is variable and may be, although it is not necessarily, longer than the duration of the machine instruction signal $MI_1$. In a similar manner, the time $\Delta t_2$ required to perform the addition is also variable. Further, the time $\Delta t_2$ may start well after the time of machine instruction signal $MI_2$ has terminated and may end well after the time the machine instruction signal $MI_3$ has arrived. Similarly, the time $\Delta t_3$ required to read-out the sum word and apply it via the output Y bus to the register (not shown) which stores the sum word is also variable.

Figure 3:
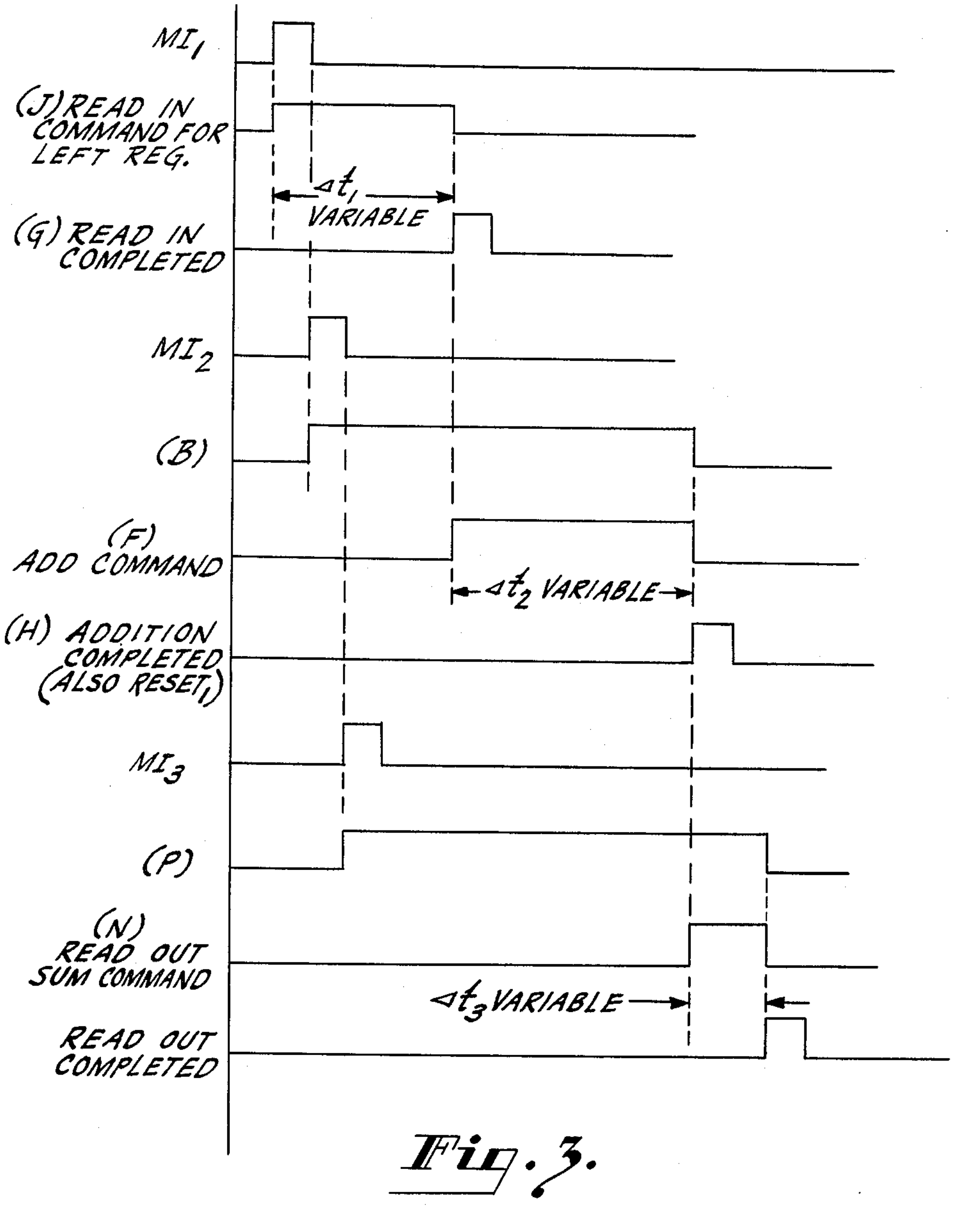
FIGURE 3 is a drawing of a waveform present in various places in the circuits of FIGURES 2, 4, 5 and 6.

The circuit to be described converts the $MI_1$ signal to a "read-in" command J for the left register, as shown in FIGURE 3. This command has a duration $\Delta t_1$. It is applied to input terminal 29 of FIGURE 2 and serves as a priming signal for the "and" gates 10, 11 . . . 12 to the left register. The circuits to be described also convert the machine instruction signal $MI_2$ to the "add" command F (FIGURE 3) which is applied to the input terminal 30 of FIGURE 2. The circuits to be described also convert the machine instruction signal $MI_3$ to the "read-out sum" command N which is applied to the input terminal 31 of FIGURE 2. As can be seen from FIGURE 3, these signals are appropriately timed and of proper duration.

The circuit shown in FIGURE 5 includes flip-flops 80 and 82. The 1 output of flip-flop 80 is the read-in command J. The 0 output of flip-flop 80 serves as an input to "nor" gate 84. The 1 output of flip-flop 82 serves as an input to "nor" gate 86. "Nor" gate 86 is a one input gate and is the logical equivalent of an inverter. The logical sum $C+D$ (the common connection between leads 93 and 92 is the logical equivalent of an "or" gate) of the outputs of "nor" gates 84 and 86 is applied via leads 93 and 92, respectively, to inverter 88. The output of the inverter 88 serves as a second input to "nor" gate 84. It serves also as the add command F.

In the operation of the circuit of FIGURE 5, flip-flops 80 and 82 are initially both reset. Under these conditions J, the read-in command, is 0. Thus, the input "and" gates 10, 11 . . . 12 to the left register 16 of FIGURE 2 are disabled. Similarly, F, the add command, is 0. This disables the asynchronous binary adder.

Assume now that a word is present on bus X and $MI_1$ occurs. $MI_1$ sets flip-flop 80, changes J to 1. This primes the input "and" gates 10, 11 . . . 12 (FIGURE 2) of the left register, and the data word flows through these "and" gates into the left register. The 0 output terminal of flip-flop 80 changes to "0"; therefore $A=0$. B remains 0; therefore $D=1$, $E=0$, $C=1$; F, the add command, therefore remains 0.

Figure 1A:
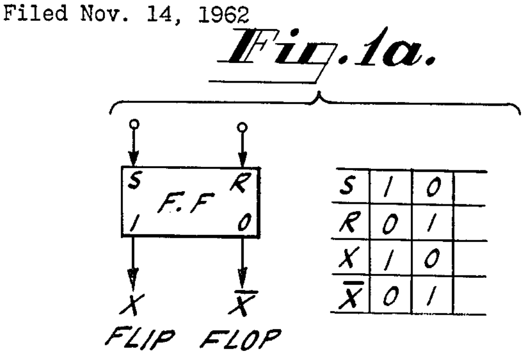
Figure 1B:
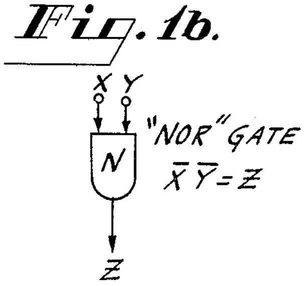
Figure 1C:
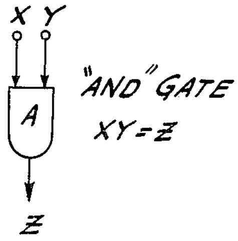
Figure 1D:
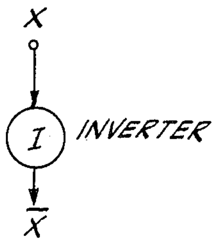
Figure 4:
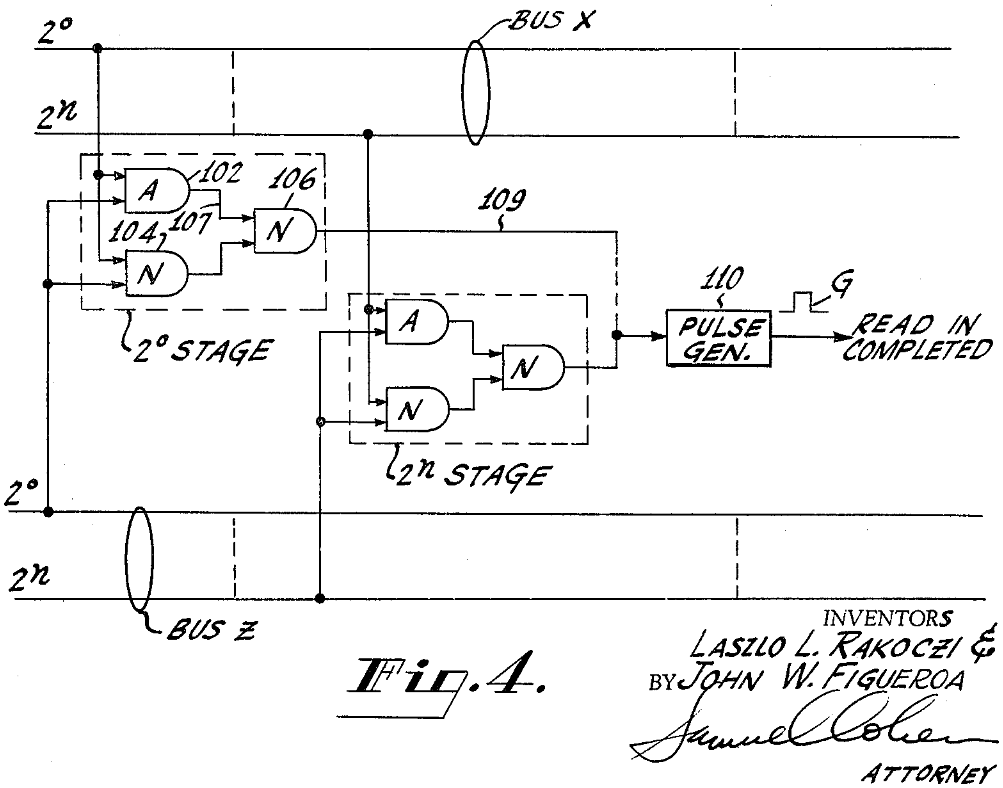
FIGURE 4 is a block diagram of a circuit for generating an output signal when the transfer of a word into a register has been completed.

In the data processing machine under consideration, when the transfer of a word has been completed, a signal $G=1$ occurs. This signal is applied to the reset terminal of flip-flop 80. The circuit for producing the signal G is shown in FIGURE 4 and will be discussed shortly. However, for the purposes of the present discussion, it is assumed that the second machine instruction signal $MI_2$ occurs prior to the time that $G=1$ occurs. Under these conditions, flip-flop 82 becomes set while flip-flop 80 is also in its set condition. Since flip-flop 80 remains set, J remains 1 and the read-in command continues. However, B changes to 1. This changes D to 0, but as C remains 1, E remains 0. Since E is 0 and A is 0, C remains 1; therefore F remains 0.

Summarizing the above, the premature arrival of machine instruction signal $MI_2$ does not terminate the read-in command. Further, it does not cause the add command F to start.

Assume now that after the machine instruction signal $MI_2$ has arrived, the transfer of the word from the bus X into the left register has been completed. This causes the generation of the signal G which resets register 80. This changes J to 0, terminating the read-in command. A also changes to 1, causing C to change to 0. Flip-flop 82 remains set so that B is 1 and D is 0; therefore the logical sum $C+D$ is 0, changing E to 1 and changing the add command F to 1.

Summarizing the above, when the read-in is completed and the signal G occurs after the $MI_2$ arrives, the read-in command J changes to 0, terminating the read-in. Also, the add command F changes from 0 to 1, causing the addition to start.

In some cases, the machine instruction signal $MI_2$ does not occur until after $MI_1$ and G have occurred. In this case, AB changes from 10 to 00, to 10 to 11 corresponding to the following four states of J and F: $J=0$, $F=0$, $J=1$, $F=0$; $J=0$, $F=0$; $J=0$, $F=1$. Under this set of conditions, the add command starts concurrently with $MI_2$, as desired.

A number of the operations described above are given succinctly in the table below:

*Table I*

| $MI_1$ | G | $MI_2$ | H | A | B | C | D | E=F | J | |
|---|---|---|---|---|---|---|---|---|---|---|
| ------ | ----- | ----- | ----- | 1 | 0 | 0 | 1 | 0 | 0 | Start: both FF's reset. |
| 1<br>------ | -----<br>----- | -----<br>1 | -----<br>----- | 0<br>0 | 0<br>1 | 1<br>1 | 1<br>0 | 0<br>0 | 1<br>1 | Read-in command.<br>=1. |
| ------ | 1 | ----- | ----- | 1 | 1 | 0 | 0 | 1 | 0 | Add command=1. |
| ------ | ----- | ----- | 1 | 1 | 0 | 0 | 1 | 0 | 0 | Read-in command=0.<br>Read-out command=0. |

The "nor" gate 94 shown at the left of FIGURE 5 is for the purpose of indicating an error. Suppose $MI_1$ should occur before the add command has terminated. During the add command, $F=1$, $B=1$, $A=1$, $D=0$, $E=1$, $C=0$. If now $MI_1$ occurs, A changes to 0, and J, the read-in command, changes to 1. But D is 0, and E, which is 1, keeps $C=0$; therefore F, the add command, remains 1. This is an undesired condition and is indicated by the output $T=1$ which results because both $A$ and $C=0$.

Figure 6:
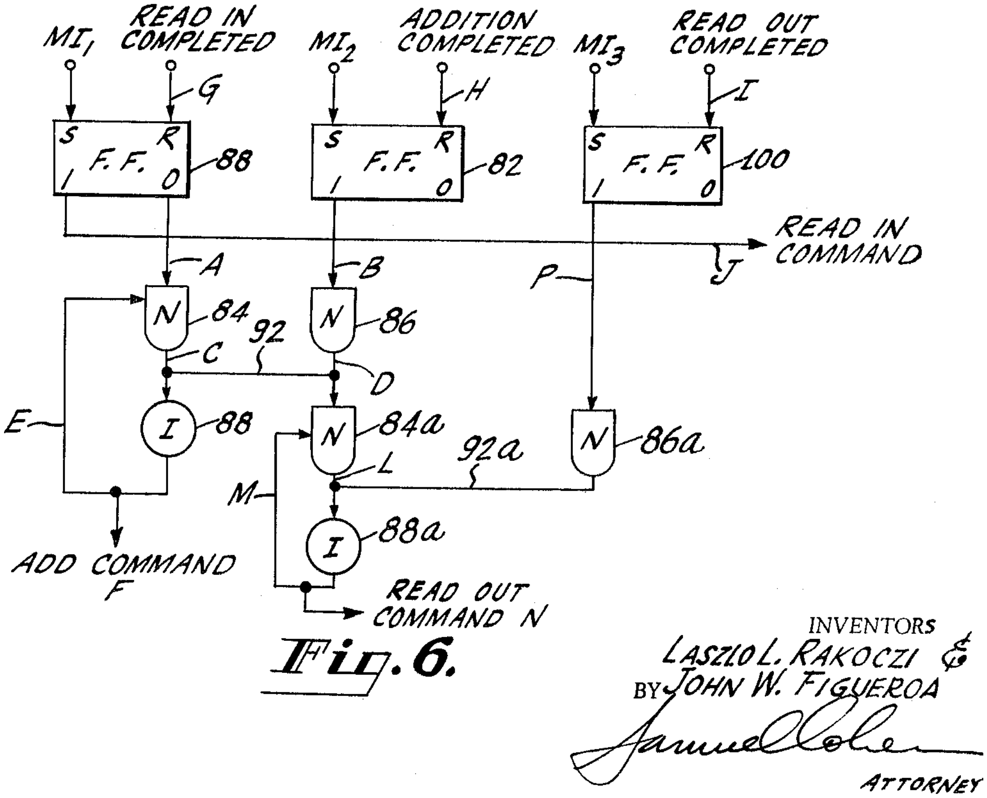

The circuit of FIGURE 5 is illustrated as there are a number of places in asynchronous data processing machines where the sequence of operations depend only upon two successive machine instruction signals. To obtain commands from three successive machine instruction signals, an additional circuit similar to a portion of the circuit of FIGURE 5 may be added to the circuit of FIGURE 5. The combined circuit including the various feedback paths is shown in FIGURE 6. In addition to the elements of FIGURE 5, FIGURE 6 includes a third flip-flop 100. The "nor" gate **86*a* connected to the 1 output of the flip-flop 100 is analogous to "nor" gate 86. The "nor" gate 84*a* and inverter 88*a* are analogous to "nor" gate 84 and inverter 88, respectively. The feedback path carrying the signal M is analogous to the feedback path carrying the signal E. Interconnection 92*a* is analogous to the interconnection 92**.

The operation of the circuit of FIGURE 6 is given succinctly in Table II below:

*Table III*

| AB | 00 | 01 | 10 | 11 |
|---|---|---|---|---|
| E | | Ê | | |
| 0 | 0 | 0 | 0 | 1 |
| 1 | 0 | 1 | 0 | 1 |

FIGURE 4 shows the circuit for generating the "read-in completed" signal G shown as the third waveform of FIGURE 3. It includes a total of $n+1$ logic stages, one stage for each wire of bus X, two of which, the $2^0$ and $2^n$ stages, are shown in FIGURE 4. Each stage includes an "and" gate 102, a "nor" gate 104 and a "nor" gate 106. The "nor" gate 106 receives the outputs of "and" gates 102 and 104.

The bus X shown in FIGURE 4 is the bus X of FIGURE 2. The bus Z in FIGURE 4 is the output bus connected to the 1 terminals of the left register 16 of FIGURE 2.

In the operation of the circuit of FIGURE 4, the transfer of a word may be considered to be completed when the word present at the 1 output terminals of the flip-flops is equal to the word present on the input bus to the flip-flop. In other words, the transfer is completed when the word on bus X equals the word on bus Z. Under these conditions, the corresponding bits on each

*Table II*

| $MI_1$ | $MI_2$ | $MI_3$ | G | H | I | A | B | C | D | P | K | L | J | E=F | M=N |
|---|---|---|---|---|---|---|---|---|---|---|---|---|---|---|---|
| ------ | ----- | ----- | ----- | ----- | ----- | 1 | 0 | 0 | 1 | 0 | 1 | 0 | 0 | 0 | 0 |
| 1 | ----- | ----- | ----- | ----- | ----- | 0 | 0 | 1 | 1 | 0 | 1 | 0 | 1 | 0 | 0 |
| ------ | 1 | ----- | ----- | ----- | ----- | 0 | 1 | 1 | 0 | 0 | 1 | 0 | 1 | 0 | 0 |
| ------ | ----- | ----- | 1 | ----- | ----- | 1 | 1 | 0 | 0 | 0 | 1 | 1 | 0 | 1 | 0 |
| ------ | ----- | 1 | ----- | ----- | ----- | 1 | 1 | 0 | 0 | 1 | 0 | 1 | 0 | 1 | 0 |
| ------ | ----- | ----- | ----- | 1 | ----- | 1 | 0 | 0 | 1 | 1 | 0 | 0 | 0 | 0 | 1 |
| ------ | ----- | ----- | ----- | ----- | 1 | 1 | 0 | 0 | 1 | 0 | 1 | 0 | 0 | 0 | 0 |

In the circuit of FIGURE 6, the error circuits analogous to "nor" gate 94 of FIGURE 5 are not shown. However, they may be present and may be interconnected similarly to "nor" circuit 94.

In the circuit of FIGURE 5, that part within block 200 includes "nor" gate 84 or "nor" gate 86 (or its logical equivalent, an inverter), and inverter 88. It should be appreciated that alternate forms of this circuit are possible. One example is the circuit of FIGURE 7 which includes "and" gate 202, inverter 204 and flip-flop 206. "And" gate 202 receives the signals A and B and applies its output to the set terminal (S) of flip-flop 206. Inverter 204 receives signal B and applies its output to the reset terminal (R) of flip-flop 206.

The operation of the circuit of FIGURE 7 is given in Table III below. In the table, E is the present "state" of the flip-flop, that is, the value of the binary bit appearing at 1 output terminal. Ê is the next value of E which occurs in response to the combination of bits AB applied to the circuit 200. For example, the table shows that if E is presently 0, and $A=1$, $B=1$ are applied to circuit 200, E changes to 1, that is $\hat{E}=1$. Similarly, if E is presently 1 and $A=1$, $B=0$ are applied to circuit 200, E changes to 0. But, if E is presently 1 and $A=0$, $B=1$, then E remains 1.

bus are the same. For example, if the bit on the $2^0$ wire is 1 on bus X, it is also 1 on bus Z. If so, "and" gate 102 is enabled, producing a 1 output on lead 107 and this 1 output disables "nor" gate 106. This produces a 0 on output lead 109. If, on the other hand, the $2^0$ bit on both buses is a 0, "nor" gate 104 becomes enabled and the bit on bus 109 again becomes 0. If the transfer is not completed, the corresponding bits, for example the $2^0$ bit, may be unequal in which case gates 102 and 104 will each produce a 0 output and "nor" gate 106 will produce a 1 output.

The pulse generator 110 receives the logical sum of the outputs of the $2^0$ through the $2^n$ stages. If the logical sum is 1, indicating that at least one bit on bus X and its corresponding bit on bus Z are unequal, the pulse generator produces no output. However, when all bits are unequal, the logical sum of the $2^0$ through $2^n$ stages is 0. The pulse generator in response to this 0 input produces a 1 output signal G. This is the signal which is applied to the reset terminal 80 of FIGURE 6.

Although not shown in FIGURE 2, a circuit similar to that of FIGURE 4 may be employed to generate the signal I applied to the reset terminal of flip-flop 100. The buses between which the stages of FIG. 4 are connected to generate this signal are the bus Y in FIGURE 2 and another bus (not shown) at the output of the register (not shown) which receives the sum word.

The circuits for generating the read-in command for the right register 23 may be similar to those for generating the read-in command for the left register 16. These circuits for generating read-in commands respond to a fourth machine instruction signal (not shown). Separate circuits for generating the reset 1 and reset 2 signals of the left and right registers of FIGURE 2 are not shown. However, the reset 1 signal may be derived from the leading edge of the add command signal J. The circuit may include a monostable multivibrator or similar pulse generating circuit. The reset 2 signal may be generated by a similar circuit.

While illustrated in terms of the control of an arithmetic operation, it should be mentioned that the circuit of the present invention has many other uses as a digital data processing machine. For example, there are places in the machine where it is sometimes desired to interrupt a sequence of operations being performed but to do so only after the one operation being performed has been completed. In this case, the machine instruction $MI_1$ (FIG. 5) can be consided the "start data processing" signal. This causes J to equal 1 and the data processing to begin. If now, before the operation is completed, it is desired to stop the sequence of operations, a "stop" signal $MI_2$ can be applied. However, this stop signal will not be effective until the "operation completed" signal G occurs. At that time, J becomes equal to 0 and F becomes equal to 1, where F, in this case, is a "stop operation" command.

In certain other places in the data processing machine, it may be desired, unconditionally to stop an operation, regardless of whether or not it has been completed and to thereafter start the next operation. This can be accomplished by having a third input to "nor" gate 84 of FIG. 5, which third input is normally a zero. $MI_1$ is now considered the start operation signal and it may be assumed that it has occurred. Assume that $MI_2$ has also occurred. $MI_2$ calls for the next operation to be started. On the other hand, the G equals 1 signal has not yet occurred. If now the third input to "nor" gate 84 is changed to a 1, this unconditionally stops the operation called for by $MI_1$ (even though not yet completed) and starts the operation called for by $MI_2$.

In the discussion of FIG. 5, it is mentioned that a one input "nor" gate such as 86 is the logical equivalent of an inverter. In a number of the claims, this gate is referred to as an inverter.

What is claimed is:

1. In combination, a "nor" gate; an inverter; means for producing the complement of the logical sum of the inverter and "nor" gate outputs; and a feedback circuit means for applying said complement to the "nor" gate.

2. In the combination set forth in claim 1, said inverter comprising a one input "nor" gate.

3. In combination, a two input "nor" gate; an inverter; means for producing the complement of the logical sum of the inverter and "nor" gate outputs; a feedback circuit means for applying said complement to one input of the "nor" gate; and means for applying signals indicative of binary digits to the second input to the "nor" gate and inverter, respectively.

4. In combination, a "nor" gate having two input terminals, one for receiving an input signal; a first inverter having an input terminal for receiving an input signal; a second inverter; means for deriving a signal indicative of the logical sum of the output signals of the "nor" gate and first inverter and applying said signal to said second inverter; and means for applying the output signal of said second inverter to the second input terminal of the "nor" gate.

5. In combination, a "nor" gate having two input terminals, the first for receiving a first input signal indicative of a binary digit;

a first inverter having an input terminal for receiving a second input signal indicative of a binary digit;

a second inverter;

means for producing a signal indicative of the logical sum of the output signals of the "nor" gate and first inverter and applying that signal through the second inverter to the second input terminal of the "nor" gate;

and means coupled to the first input terminal of the "nor" gate and the output circuit of the "nor" gate for indicating the presence of a zero at both points concurrently.

6. In combination, a first "nor" gate having two input terminals, one for receiving a first input signal;

a first inverter having an input terminal for receiving a second input signal;

a second inverter;

means for producing a signal indicative of the logical sum of the output signals of the first "nor" gate and first inverter and applying that signal through the second inverter to the second input terminal of the first "nor" gate;

a second "nor" gate having two input terminals, the first connected to receive the signal indicative of the logical sum of the output signals of the first "nor" gate and first inverter;

a third inverter having an input terminal for receiving a third input signal;

a fourth inverter;

and means for producing a signal indicative of the logical sum of the output signals of the second "nor" gate and third inverter and applying that signal through the fourth inverter to the second input terminal to the second "nor" gate.

References Cited by the Examiner

UNITED STATES PATENTS

| | | | |
|---|---|---|---|
| 2,998,191 | 8/1961 | Marshall | 235—153 |
| 3,058,656 | 10/1962 | Pomerene | 235—153 |
| 3,067,934 | 12/1962 | Amacher et al. | |
| 3,075,089 | 1/1963 | Maley. | |
| 3,083,305 | 3/1963 | Maley. | |
| 3,103,577 | 10/1963 | Willard | 328—93 X |
| 3,107,306 | 10/1963 | Dobbie | 307—88.5 |
| 3,113,273 | 12/1963 | Tendick | 307—88.5 |
| 3,162,816 | 12/1964 | Rakoczi et al. | 307—88.5 |

ARTHUR GAUSS, *Primary Examiner.*

MALCOLM A. MORRISON, *Examiner.*

M. POKOTILOW, I. C. EDELL, *Assistant Examiners.*